United States Patent [19]

Conde et al.

[11] 3,947,902

[45] Apr. 6, 1975

[54] APRON AND DRIVE MECHANISM FOR OBJECT TRANSFERRING APPARATUS

[75] Inventors: John Conde; Jose Castro, both of Mayaguez, P.R.

[73] Assignee: Mobilizer Medical Products, Inc., Summit, N.J.

[22] Filed: Mar. 17, 1975

[21] Appl. No.: 558,938

[52] U.S. Cl. .......................... 5/81 R; 5/86; 198/202

[51] Int. Cl.[2] ........................ A61G 1/02; F16H 7/18

[58] Field of Search ........ 5/81 R, 81 C, 86; 198/202

[56] References Cited

UNITED STATES PATENTS

| | | | |
|---|---|---|---|
| 3,579,672 | 5/1971 | Koll et al. | 5/81 R |
| 3,765,037 | 10/1973 | Dunkin | 5/81 C |
| 3,829,915 | 8/1974 | Dunkin | 5/81 C |

*Primary Examiner*—Casmir A. Nunberg
*Attorney, Agent, or Firm*—Lane, Aitken, Dunner & Ziems

[57] ABSTRACT

An improved apron and apron drive mechanism for object or patient transferring apparatus of the type in which different phases of transfer operation are effected by selective linear travel in a transfer apron. The transfer apron to carry out the transfer operation in conjunction with a translatable separator plate is formed from a finite length of flexible belt material, the opposite ends of which are attached to winding rollers operated to pay out, take in or hold stationary apron flight portions in direct synchronism with a common drive shaft for translating the separator.

15 Claims, 14 Drawing Figures

LOAD

LOAD RETRACT

UNLOAD

UNLOAD RETRACT

APRON AND DRIVE MECHANISM FOR OBJECT TRANSFERRING APPARATUS

BACKGROUND OF THE INVENTION

This invention relates to improvements in apparatus for transferring objects and more particularly, it concerns an improved apron and drive mechanism for apparatus used principally to transfer non-ambulatory patients from a hospital bed or other surface on which they are initially reclined to a mobile carriage by which they may be supported and/or subsequently transferred to a second surface such as a surgical table, X-ray table or another bed.

The development of object or patient transferring apparatus of the type to which the present invention principally pertains is reflected in the disclosures of the following U.S. patents: No. 3,493,979 issued Feb. 10, 1970, to Laurel A. Koll and Walter Crook, Jr.; No. 3,579,672 issued May 25, 1971, to Laurel A. Koll and Walter Crook, Jr.; No. 3,765,037 issued October 16, 1973, to Albert Dunkin; and No. 3,829,915 issued Aug. 20, 1974, to Albert Dunkin. The apparatus particularly disclosed in the latter two of these patents has been commercialized and is currently found in many hospitals and similar institutions.

In essense, such apparatus includes, in addition to a load carrying mobile base or chassis, a pair of laterally translatable superposed, sheet-like apron supporting separator members about which a pair of upper and lower fabric-like aprons are trained. The aprons are established by very thin endless belts formed of fiberglass or nylon reinforced teflon and are independently controlled in a manner such that during lateral extension of the separators out over a bed and under a patient to be transferred, the respective flight portions of the upper and lower aprons which contact the patient and the bed remain relatively stationary and thus isolate both the patient and the bed from frictional contact with the laterally moving separator plates. When the patient is fully positioned on the assembly of aprons and separator plates, the condition of the upper apron is changed so that the upper flight portion thereof, in physical contact with the patient, will move in the same direction and at the same linear speed as the separator plates during retraction to transfer the patient from the bed or other surface on which he was initially reclined to the mobile chassis. The lower flight portion of the lower apron is fixed to the chassis of the apparatus so that it remains stationary with respect to the surface of the bed also during the retraction of the separator and apron assembly. Correspondingly, the lower flight portion of the upper apron slides relative to the upper flight portion of the lower apron with which it is in frictional contact. Such sliding motion between the aprons or belts is accommodated by the low friction characteristics of the reinforced teflon from which they are made and the generation of unwanted static electricity is avoided by impregnating one or both of the belts forming the aprons with a conductive material such as graphite.

Although the use of fabric-like coverings or aprons to isolate an object from frictional contact with a supporting member advanced laterally under the object was known prior to the development represented by the aforementioned U.S. patents, the basic apparatus disclosed particularly in No. 3,579,672 and No. 3,765,037 possesses several unique features which are believed to be the basis for its immediate acceptance in the patient transfer field. Foremost of these features is the universal flexibility of the apron and separator assembly by which this assembly may conform to the irregular and unpredictable contour of the human anatomy reclined on a yieldable surface such as a bed mattress. This feature, combined with the facility for retaining to one-half inch or less the thickness of the plate-like transfer assembly movable under the object or patient to be transferred, enables a combined "softness" and "thinness" which makes it difficult for a bedridden patient to feel the assembly moving beneath him, not to mention a total absence of discomfort. Secondly, the provision for changing the condition of the upper apron relative to its separator plate not only enables the lateral loaded retraction of the assembly of aprons and plates to effect the transfer of the object or patient back to the apparatus, but does so without in any way lifting the object or patient from the surface on which he is initially reclined and with which a patient identifies emotionally. This feature is enhanced further by the upper apron defining a continuous surface extending from beneath the patient to the remote side of the apparatus to which the patient is transferred. As a result, the transfer of a hospital patient can be effected without subjecting the patient to any measure of fear or other emotional disturbance normally associated with patient handling operations.

In the apron drive and control mechanism disclosed in U.S. Pat. No. 3,765,037 and embodied in the presently available commercial apparatus, required movement or non-movement of upper apron flight portions is achieved by an organization of loop pulling rollers and alternately actuated brake means operating on the endless belt forming the upper apron in synchronism with translation of the separator supporting the apron. Belt tracking is effected by a steering roll serving also as a component in one of the brakes. While this apron drive and control mechanism has proven in practice to be highly reliable in the operation of existing patient transfer machines and relatively maintanence-free, the drive and control mechanism itself contributes significantly to overall machine weight and manufacturing costs. While both of these factors constitute a deterrent to complete acceptance of an otherwise useful and effective patient transfer device, the problems associated with excessive weight are perhaps more critical because of effect on machine mobility and manueverability.

SUMMARY OF THE PRESENT INVENTION

In accordance with the present invention, the operating effectiveness of the described patient transfer apparatus is retained by an improved apron and drive mechanism by which the overall machine weight and manufacturing costs are significantly reduced. In particular, the apron previously effected by an endless belt of thin fabric-like reinforced teflon is replaced by a finite length of similar material attached at opposite ends to a pair of winding rollers operated to hold, pay out or take up the upper and lower flight portions of the apron trained about a translatable separator plate. A drive mechanism is provided for rotation of the winding rollers in complete synchronization with the translating movement of the apron separator plate with several required operating modes of the winding roller associated with each flight of the apron effected by relatively simple clutch or brake components in combination with varying chain drive driven sprocket sizes. The lower belt in the improved transfer apparatus of the present invention is unchanged from that of prior machines.

Accordingly, among the objects of the present invention are: the provision of an improved object transfer apparatus of the type in which the transfer function of a translatable platelike support is effected by movement of an apron of flexible web material relative to the support; the provision of such an improved object or patient transfer apparatus which results inherently in improved apron tracking relative to related components about which it is trained; the provision in such a transfer apparatus of an improved apron and apron drive mechanism; the provision of such an improved apron and drive mechanism by which overall machine weight and manufacturing cost is minimized; and the provision of such an apron and apron drive mechanism which is simply and directly synchronized with related machine operations in a highly effective manner.

Object objects and further scope of applicability of the present invention will become apparent from the detailed description to follow taken in conjunction with the accompanying drawings in which like reference numerals designate like parts.

DETAILED DESCRIPTION OF THE PREFERED EMBODIMENTS

Figure 1:
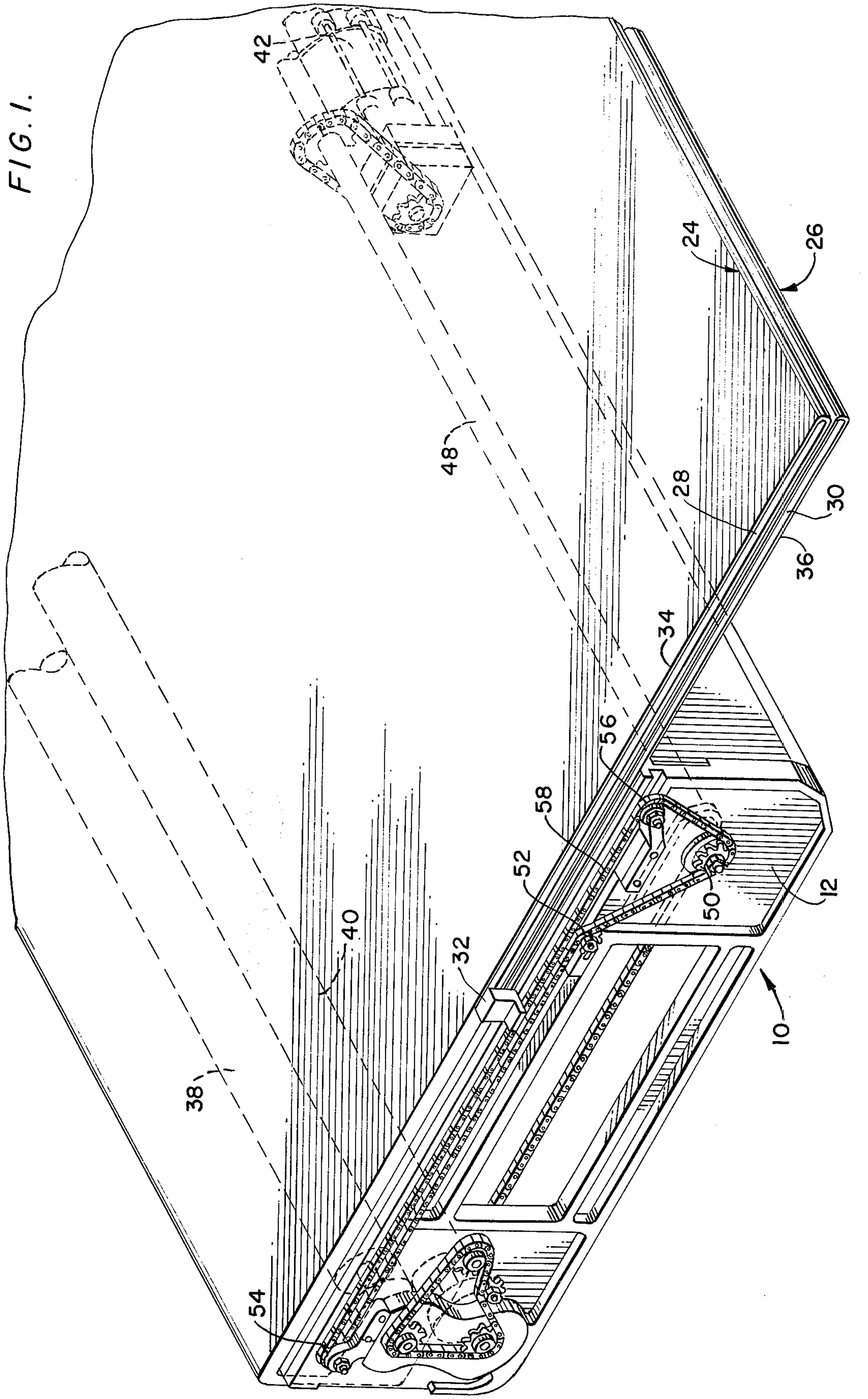
FIG. 1 is a fragmentary perspective view illustrating the upper chassis portion of an object transfer apparatus incorporating the present invention.

In the drawings, the upper chassis portion of the transfer apparatus incorporating the present invention is generally designated by the reference numeral 10. As will be appreciated by only a brief reference to the aforementioned prior patents, in practice the chassis portion 10 is supported from a wheeled base by a vertically adjustable lift mechanism to enable mobility of the apparatus in the same manner as a litter or wheeled stretcher. Neither the wheeled base or lift portions of the chassis is shown in the interest of simplifying the disclosure of the novel aspects of the present invention. The illustrated chassis portion 10 is established essentially by left and right end plates or castings 12 and 14 suitably interconnected such as by front and rear beams 16 and 18 as shown most clearly in FIG. 2 of the drawings. Also, a series of transverse beams 20 span the front and rear beams 16 and 18 to establish structural support for a deck plate 22. The deck plate 22 extends from the front to the rear edge of the upper chassis portion 10 to provide a generally planar, upwardly facing load supporting surface.

The deck plate 22 supports a pair of upper and lower apron assemblies 24 and 26 respectively, which from a functional standpoint, are similar to the apron assemblies disclosed in the above-mentioned prior patents. As such, both apron assemblies 24 and 26 are adapted for simultaneous extending or retracting translation with respect to the deck plate 22 as a result of corresponding movement of superposed upper and lower separator plates 28 and 30 interconnected on opposite ends near their inboard edges by drive brackets 32. Upper and lower aprons 34 and 36 of thin flexible belt material are respectively trained about the top, leading edge and bottom surfaces of the separator plates 28 and 30. Although the upper apron 34 extends rearwardly to a drive and control mechanism to be described in more detail below, the lower apron 36 is essentially the same as the lower apron of the apparatus disclosed in the aforementioned patents and as such, is in the nature of an endless belt wrapped also about the rear edge of the lower separator plate 30 with its lower flight portion anchored to the front edge of the chassis 10. Such anchorage of the bottom flight in the lower apron 36 will effect a stationary downwardly facing surface during translation of the lower separator 30 with attendant movement of the upper flight portion of the lower apron 36 in the direction of separator plate translation but at twice the linear velocity thereof.

As mentioned previously, the present invention departs from the body of prior art represented by the above-cited U.S. patents principally in the mechanism by which the apron assemblies 24 and 26 are driven and controlled in operation as distinguished from differing in the transfer operation effected by the apron assemblies. For this reason, reference will be made to FIGS. 9A–9D of the drawings for a review of the operating characteristics of the apron assemblies to facilitate a better understanding of the improved drive mechanism to be described. In FIGS. 9A–9D, the four basic object or patient transfer operational modes of the apron assemblies 24 and 26 are schematically depicted with arrows indicating the direction of movement taken by the separator plate and apron flight portions. Flight portions in the upper and lower aprons which are retained against movement with respect to the chassis 10 are designated by spaced dots. Thus, in the "load" mode of operation of FIG. 9A, the separator plates 28 and 30 are being advanced from their retracted position overlying the deck plate 22 to an extended position out over a bed or other surface (not shown) on which an object or patient to be transferred is initially reclined. During this operational mode, the combined thickness of both apron assemblies 24 and 26 (approximately one half inch or less) advances laterally between the patient and the surface on which the patient is reclined. As pointed out in the prior patents, the universal flexibility of the apron assemblies 24 and 26 will accommodate the diversely contoured configuration represented, for example, by the human anatomy resting on a bed mattress. Such movement of the apron assemblies 24 and 26 under the patient will occur partially as a result of the relative thinness of the apron assemblies but more significantly because of the frictional insulating function of the aprons 34 and 36 with respect to the surfaces contacted by the apron assemblies during loading movement. Specifically, the lower flight of the lower apron 36 is maintained stationary with respect to the supporting surface over which the apron assemblies are translated whereas the upper flight portion of the upper apron 34 is stationary with respect to the object or patient under which the apron assemblies pass.

To retract the object or patient back onto a position of support on the deck plate 22, the direction of separator plate translation is reversed but the condition of the upper apron 34 is changed so that both upper and lower flight portions thereof trained about the upper separator 28 move in the same direction and at the same speed as the upper separator 28. Thus in the "load retract" mode of operation, the upper apron assembly 24 functions as a unit. Operation of the lower apron assembly 26 is merely the reverse of that in the load mode of operation depicted by FIG. 9A.

Figure 9A:
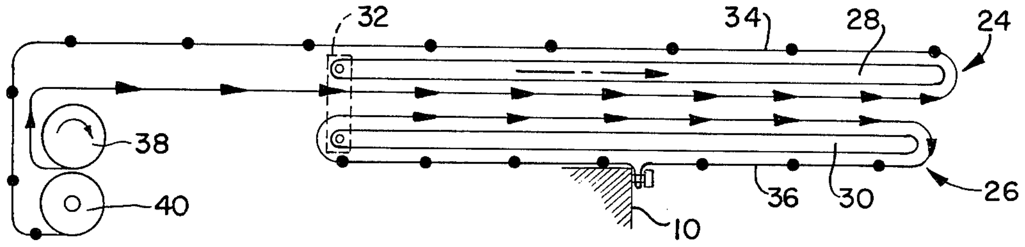
FIGS. 9A through 9D are schematic views depicting the operating modes of the apparatus of the invention.
Figure 9B:
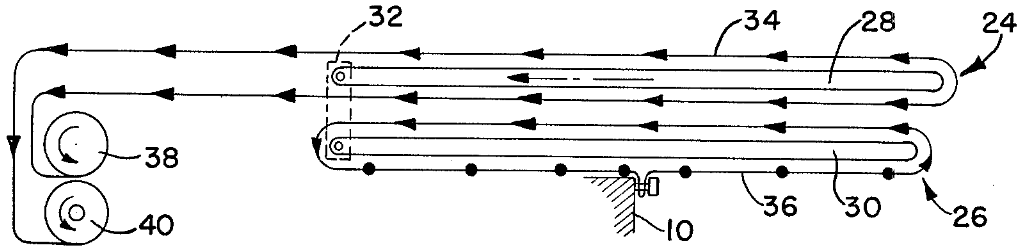
Figure 9C:
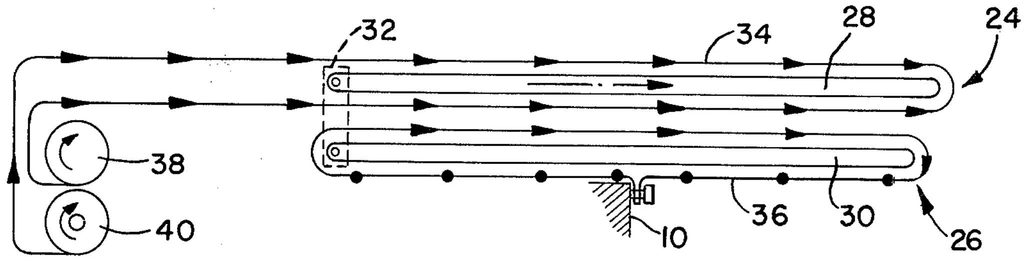

The "unload" mode of operation illustrated in FIG. 9C and by which an object or patient is transferred from the position of support on the chassis 10 to an adjacent surface is essentially the reversal of the load retract mode illustrated in FIG. 9B. Likewise the "unload retract" mode of operation in which the apron assemblies 24 and 26 are withdrawn from a position beneath an object or patient transferred by the unload mode is essentially a reversal of the load mode of operation depicted by FIG. 9A.

While the arrowhead symbols employed in FIGS. 9A–9D denote direction of apron flight travel, it is important to note that the relative velocity of apron flight movement is not as directly discernible from these figures. As mentioned above with respect to the lower apron 36, the velocity of the upper flight of the lower apron is twice that of the translating velocity of the lower separator 30 because the lower flight of the lower apron is held stationary. Similarly, the velocity of the lower flight of the upper apron 34 in both the load and unload retract modes of operation will move linearly at twice the velocity of the upper separator plate 28. In the load retract and unload operational modes of FIGS. 9B and 9C respectively, both upper and lower flights of the upper apron 34 move at the same linear velocity and in the same direction as movement of the upper separator plate 28.

In the transfer apparatus of the prior art, the four operational modes depicted by FIGS. 9A–9D were effected by manipulation of loop portions in an endless belt trained about the upper separator 28 to establish the upper apron. In accordance with the present invention, however, the upper apron 34 is established by a finite length of flexible belt material connected at opposite ends to winding rollers or drums 38 and 40 journalled at opposite ends in the end castings 12 and 14 near the rear of the upper chassis portion 10. From the previous description in connection with the schematic illustrations of FIG. 9, the rotational behavior of the winding rollers 38 and 40 to achieve the described operation of the upper apron 34 in relation to the upper separator 28 can be appreciated. In this respect it is to be noted that the limited length of the flight portions in the upper apron wrapped about the winding rollers 38 and 40 coupled with the extreme thinness of the material from which the apron is formed as well as permitted tolerances, the effective diameters of the winding rollers 38 and 40 can be presumed constant. Hence, angular movement or rotation of the winding rollers 38 and 40 is assumed directly related to linear movement in the flight portion connected to the respective winding rollers.

Figure 9D:
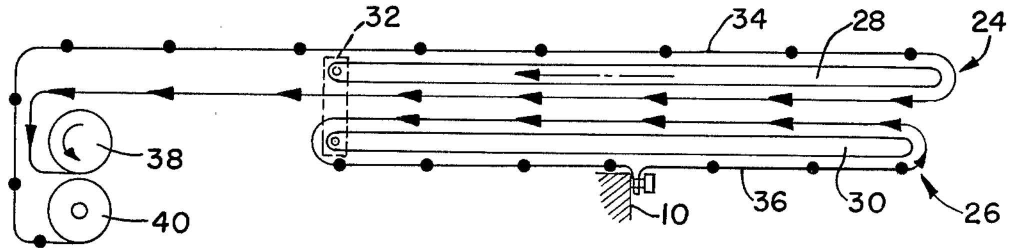

In the operational mode depicted in FIG. 9A, therefore, flight movement in the upper apron 34 is effected by retaining or braking the roller 40 while the drum 38 is rotated to pay out the lower flight portion in the upper apron 34 at a linear velocity twice that of the velocity at which the separator 28 is moving. In FIGS. 9B and 9C, both winding rollers 38 and 40 are rotated in unison to pay out or take in both flight portions of the upper apron at a tangential speed equal to the retracting movement speed of the separator 28. In FIG. 9D the roller 38 to which the lower flight portion of the apron 34 is attached must be driven at twice the speed at which it was driven for example in the load retract mode of FIG. 9B because in this instance the lower roller 40 is braked to retain the upper flight portion of the apron 34 stationary. It will be appreciated, therefore, that both rollers 38 and 40 must be capable of reversible rotation in unity with separator movement (FIGS. 9B and 9C); the roller 38 to which the lower flight portion of the upper apron 34 is attached must in addition be capable of reversible rotation at twice the speed of separator movement and the roller 40 to which the upper flight portion of the apron 34 is connected must be additionally capable of being braked.

A preferred embodiment of the drive system by which the separators 28 and 30 are translated between their retracted and extended positions in relation to the deck plate 22 as well as the transmission means by which rotational movement of the rollers 38 and 40 is effected to achieve the four modes of operation illustrated in FIG. 9 will now be explained with reference to FIGS. 1–8 of the drawings. As shown most clearly in FIGS. 1, 2 and 5 of the drawings, a reversible electric drive motor 42 is supported by a bracket 44 beneath the deck plate 22 near the front edge thereof and driveably connected by a chain 46 to a drive shaft 48 extending between the end castings 12 and 14. Journaled in each end casting 12 and 14 coaxially with the drive shaft 48 are inner and outer drive sprockets 49 and 50 coupled for rotation with the drive shaft. Both sprockets 49 and 50 are of the same size. Each of the end castings 12 and 14 further support idler sprockets 52, 54 and 56 aligned in the same plane as the outer drive sprockets 50 and about which a separator drive chain 58 is trained. The drive chain 58 is similar in function to the separator drive of the prior art and as such provides a horizontal upper flight between the idler sprockets 54 and 56 to which the brackets 32 are connected. In light of this organization the separator plates 28 and 30 will be translated with the bracket 32 in the direction of upper flight movement in the drive chain 58 which in turn will depend directly on the direction in which the sprockets 50 are driven by the motor 42.

Figure 2:
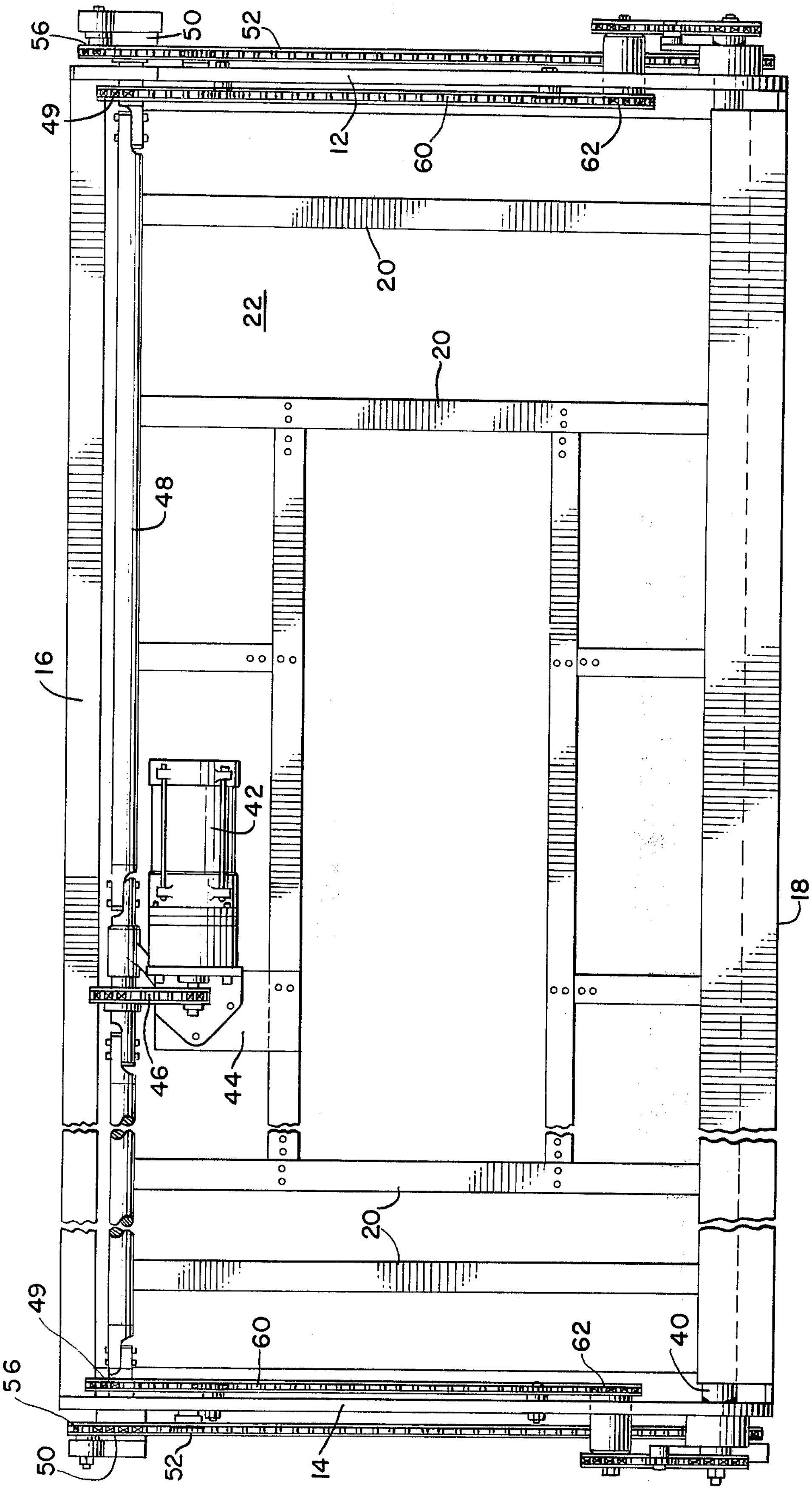
FIG. 2 is a bottom plan view of the upper chassis portion illustrated in FIG. 1.
Figure 3:
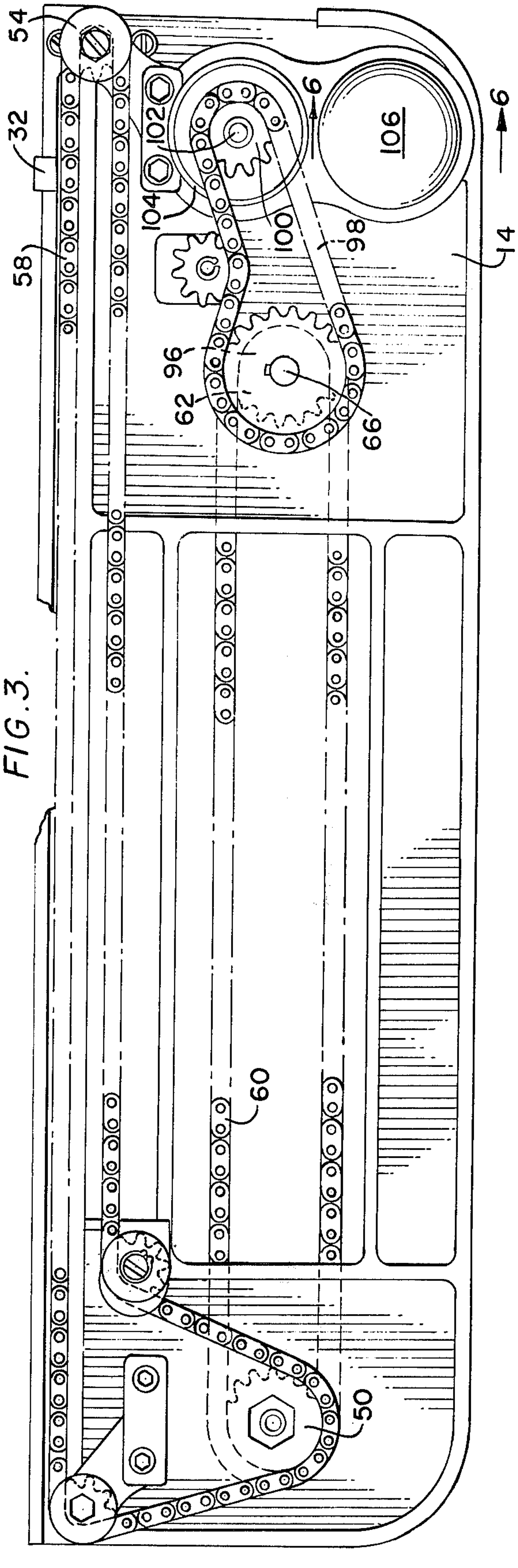
FIG. 3 is a right end elevation of the apparatus shown in FIG. 1.
Figure 4:
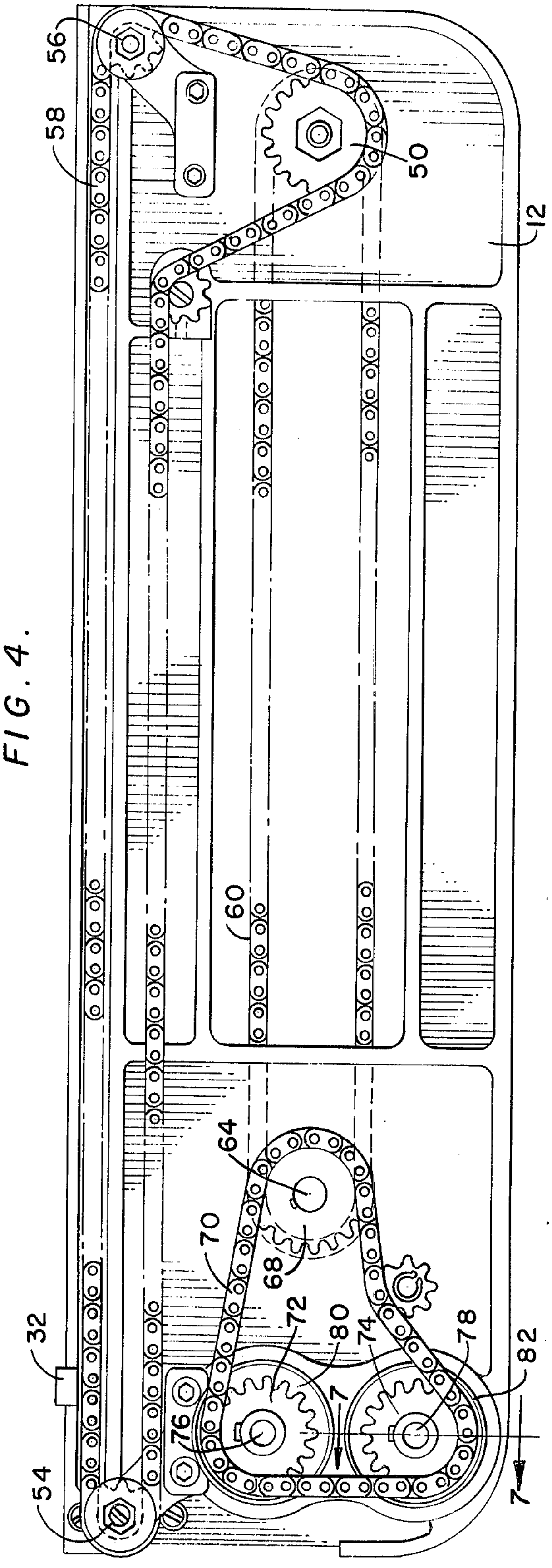
FIG. 4 is a left end elevation of the device illustrated in FIG. 1.
Figure 5:
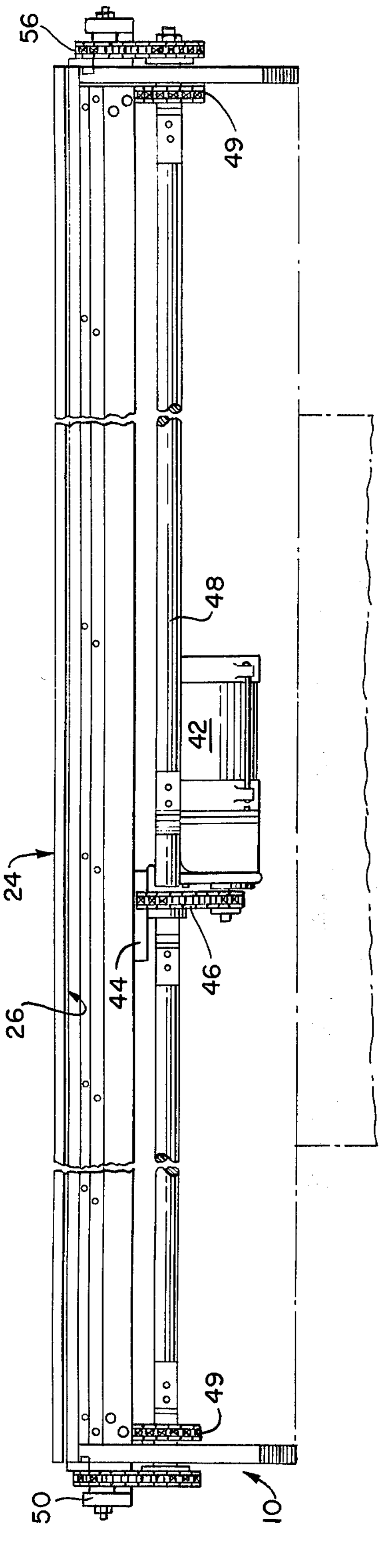
FIG. 5 is a front end elevation of the apparatus shown in FIG. 1.

As shown most clearly in FIGS. 2–4 of the drawings, the drive sprockets 49 spaced from the inner surface of the end plates 12 and 14 are each coupled by drive chains 60 with sprockets 62 of the same size as the sprockets 49 and which are keyed on countershafts 64 and 66 journalled respectively in the left and right end plates 12 and 14 near the rear of the chassis portion 10. Thus each of the countershafts 64 and 66 will be rotated at the same angular velocity as the drive shaft 48 due to the direct 1:1 drive ratio between the sprockets 49 and 62.

On the left end plate 12, the countershaft 64 supports a counter drive sprocket 68 coupled by a drive chain 70 with a pair of sprockets 72 and 74 having the same size as the sprocket 68 and also having the same effective diameter as the winding rollers 38 and 40. The sprockets 72 and 74 are keyed on shafts 76 and 78 which function as input shafts to electrically operated clutches 80 and 82, respectively and are coaxial with the winding rollers 38 and 40 to which opposite ends of the upper apron 34 are attached. Because of the common effective diameter of all sprockets on the left end plate 12 and the winding rollers 38 and 40, the tangential velocity of the winding rollers will be the same as linear velocity in the drive chain 58 during translating movement of the separators 28 and 30, assuming the sprockets 72 and 74 are coupled to the winding rollers.

Figure 7:
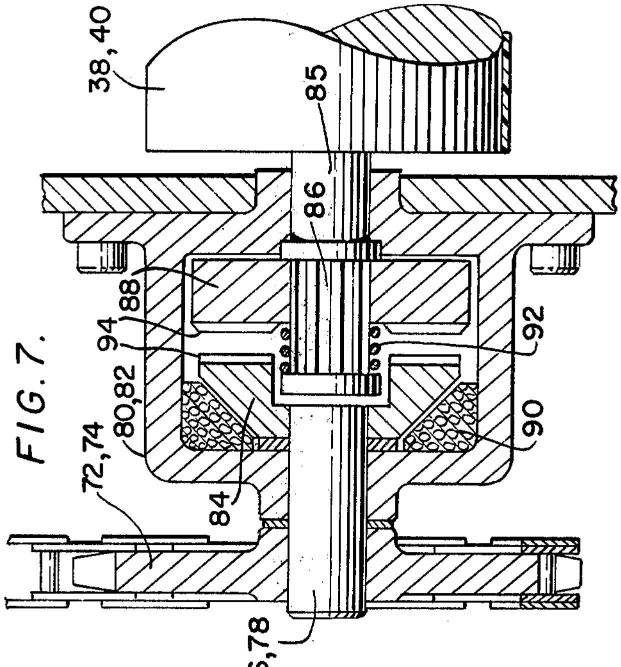
FIG. 7 is an enlarged fragmentary cross-section taken on line 7—7 of FIG. 4.

Both clutches 80 and 82 are identical in construction and may be of any conventional electrically actuated type suitable for coupling and decoupling the sprockets 72 and 74 to and from the winding rollers 38 and 40. One suitable form of clutch arrangement is illustrated in FIG. 7 to include a clutch plate 84 keyed or otherwise non-rotatably fixed to the shaft 76 (78) together with the sprocket 72 (74). A bearing shaft 85 journalled in the left end plate 12 for each of the winding rollers 38 and 40 may include a splined end portion 86 to support an axially movable clutch plate 88 non-rotatably with respect to the shafts 85 of the respective winding rollers 38 and 40. An energizing coil 90 is provided to draw the plate 88 axially against the bias of a compression spring 92 into engagement with the clutch plate 84. Each of the clutch plates may be provided on their engaging faces with appropriate teeth 94 or annular friction surfaces. Thus it will be seen that when the coil 90 is energized, the sprockets 72, 74 will be directly coupled with the winding rollers 38 and 40 whereas deenergization of the coil will allow rotation of the sprockets 72 and 74 independently of the winding rollers 38 and 40. Also it will be noted that because the sprockets 50, 68, 72 and 74 are all the same size, rotation of the rollers 38 and 40 upon energization of the clutches 80 and 82 will be at the same angular speed as the drive shaft 48 and in the same direction. Moreover, tangential velocity of the rollers 38 and 40 will be the same as linear velocity movement of the separators 28 and 30.

The countershaft 66 on the right end casting 14 (FIG. 3) carries non-rotatably on its outer end an enlarged counter sprocket 96 coupled by a drive chain 98 to a relatively small sprocket 100 keyed to the input shaft 102 of a third clutch 104. The clutch 104 is identical in construction with the clutches 80 and 82 but is operatively associated only with the winding roller 38. Moreover, the relative size of the sprockets 96 and 100 effect rotation of the winding roller 38 at a speed twice the speed at which the drive shaft 48 is rotated by the motor 42.

Figure 6:
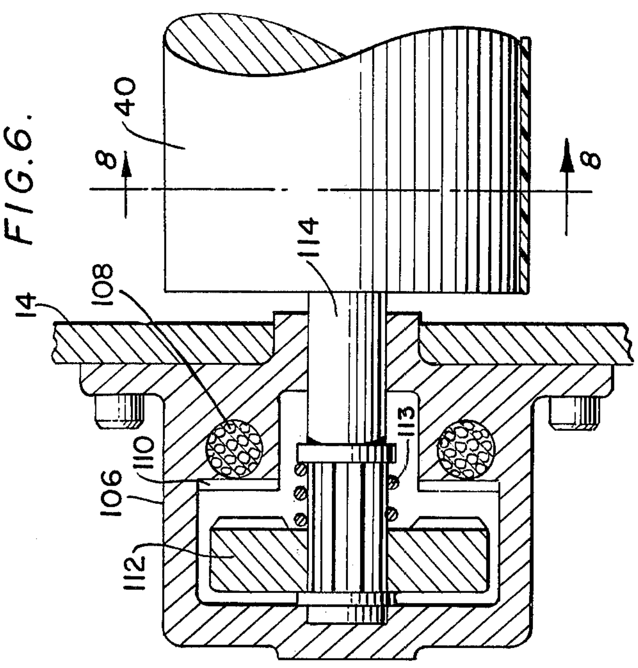
FIG. 6 is an enlarged fragmentary cross-section taken on line 6—6 of FIG. 3.

Associated with the right end of the winding roller 40 to which the upper flight of the upper apron 34 is connected is an electrically actuated brake 106, one suitable form of which is illustrated in FIG. 6 of the drawings. In this instance, a coil 108 mounted behind a fixed or stationary friction face 110 will, when energized, draw into engagement with the face 110 a movable friction plate 112 against the bias of a neutralizing spring 113 all secured on the right end shaft 114 of the winding roll 40. Because of the splined connection of the movable friction plate 112 with the shaft 114, movement of the plate against the stationary surface 110 upon energization of the coil 108 will effect a braking retention of the roller 40 against rotation.

Figure 8:
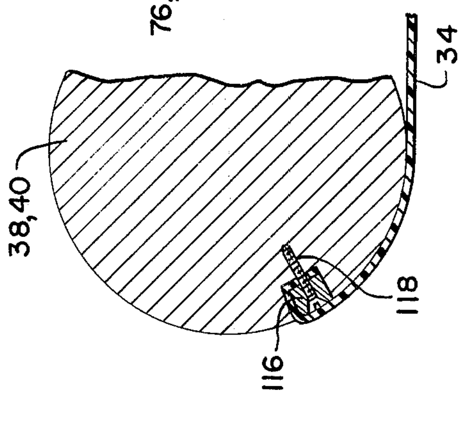
FIG. 8 is a fragmentary cross-section taken on line 8—8 of FIG. 6.

One suitable arrangement for connecting opposite ends of the upper apron 34 to the winding rollers 38 and 40 is illustrated in FIG. 8 of the drawings. As shown, the roller is provided with a radial groove adapted to receive a clamping bar 116 retained in the groove against the end portion of the aprons by screws 118. Also, the guide means by which the upper and lower flight portions of the upper apron 34 are trained about the rear or inner edge of the deck plate 22, though not detailed in the drawings, is provided by the rear deck beam 18 as described in U.S. Pat. No. 3,765,037.

It will be appreciated from the foregoing description that the motor 42, drive shaft 48 and drive sprockets 49 and 50 establish a common drive means both for translating the separators 28 and 30 by way of the drive chains 58 and for rotating the winding rollers 38 and 40. Also, a first drive train effected at the left end plate through the counter shaft 64, sprocket 68, chain 70 and sprockets 72 and 74 is operable, when the clutches 80 and 82 are energized, to connect the winding rollers with the drive shaft 48 on a 1:1 transmission ratio whereas a second drive train formed by the counter shaft 66, sprockets 96 and 100 at the right end plate connect the winding rollers with the drive shaft on a 2:1 transmission ratio. The first and second drive trains thus provided are in practice operated alternately to effect the four operational modes depicted in FIG. 9. Specifically, in the load operational mode the clutches 80 and 82 on the left end casting will be deenergized while the clutch 102 and brake 106 on the right end casting will be energized. As the motor 42 is operated to rotate the drive sprockets 50, the brackets 32 and correspondingly the separators 28 and 30 will be advanced from their retracted position outwardly toward the extended position. Simultaneously, the winding roller 38 will be rotated in a direction to pay out the lower flight portion of the upper apron at a speed twice that of the separators 28 and 30. The upper flight portion of the apron will remain stationary in light of the braked condition of the roller 40. The energization of the three clutches and the brake 106 will be the same in the unload retract mode of operation depicted by FIG. 9D. The only difference here is that the direction of drive shaft rotation will be reversed.

In the load retract and unload operational modes depicted by FIGS. 9B and 9C, the brake 106 as well as the clutch 104 on the right end casting 14 will be deenergized whereas both clutches 80 and 82 on the left end casting 12 will be energized. Because of the 1:1 ratio of drive sprockets on this end of the chassis, both winding rollers 38 and 40 will be rotated at the same speed and in a direction to move the upper apron in synchronism with the upper separator plate 28.

Figure 10:
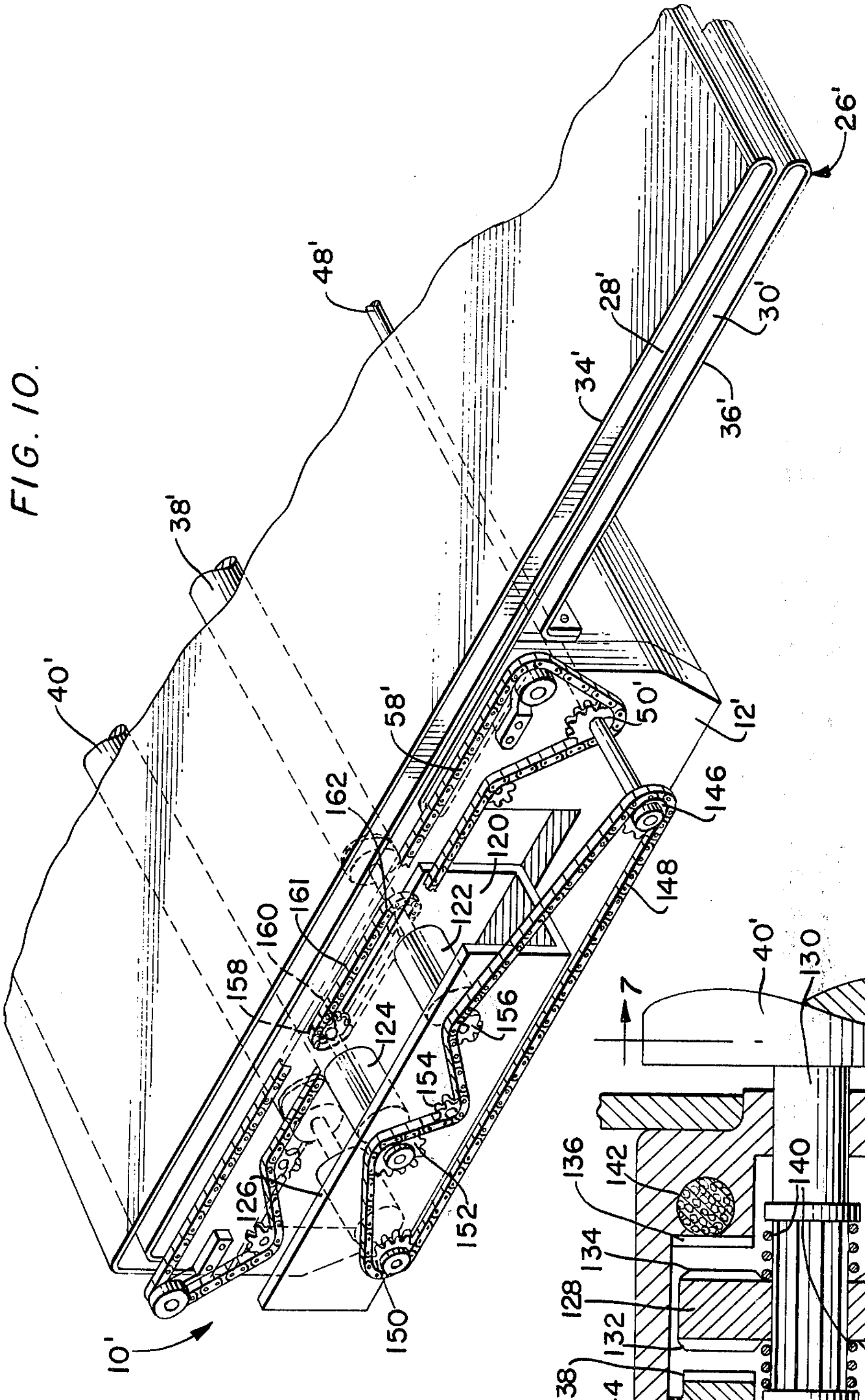
FIG. 10 is a fragmentary perspective view of an alternative embodiment of the invention.
Figure 11:
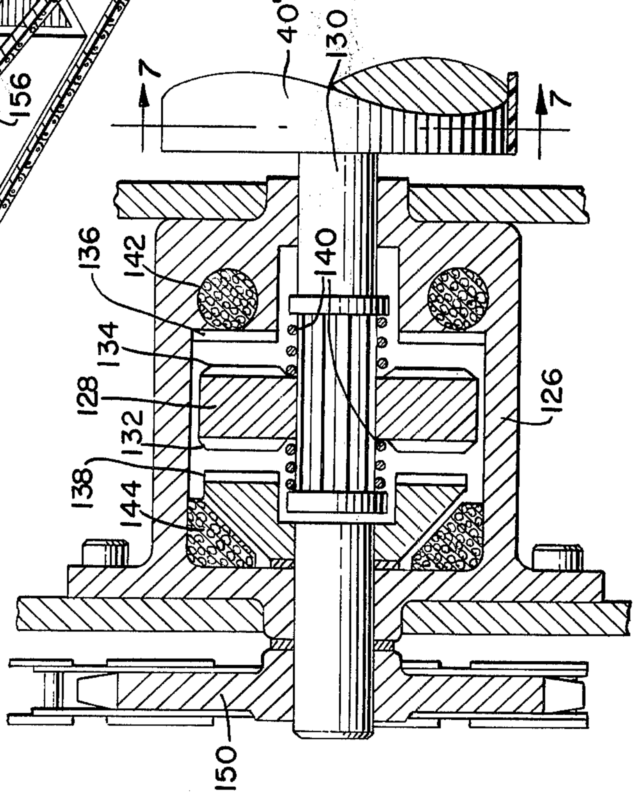
FIG. 11 is an enlarged fragmentary cross-section of a clutch-brake suitable for use in the embodiment of FIG. 10.

In the alternative embodiment of the invention illustrated in FIGS. 10 and 11 of the drawings, components already described in the previous embodiments are designated by the same reference numerals but primed. In this embodiment, the positional relationship of the winding rollers 38′ and 40′ with respect to the chassis 10′ is modified in that the winding roller 38′ to which the lower flight portion of the upper apron 34′ is connected is located centrally of the chassis 10′ whereas the location of the roller 40′ remains essentially unchanged. Also, the end plate 12′ is modified to include a bracket extension 120 to support a pair of electrically operated clutches 122 and 124 and an electrically operated clutch-brake 126. The clutches 122 and 124 are identical in all respects to the clutches 80 and 82 illustrated in FIG. 7 of the drawings and described above. The clutch-brake 126 is illustrated in FIG. 11 and includes a sliding clutch plate 128 splined to the end shaft 130 of the roller 40'. The clutch plate 128 has oppositely facing friction surfaces or radial teeth 132 and 134 normally positioned in a central or neutral position between a braking surface 136 and a similar surface on a driving clutch plate 138 by a pair of compression springs 140. An electromagnetic coil 142 located behind the braking surface 136 is effective when energized to draw the clutch plate 128 into braking engagement with the surface 136 whereas energization of a coil 144 will draw the clutch plate axially against the driving clutch plate 138.

With reference again to FIG. 10 of the drawings, the drive shaft 48' supports in addition to the sprocket 50' a winding roller drive sprocket 146 engaged by an endless drive chain 148. The drive chain 148 additionally engages a sprocket 150 keyed to the input shaft and drive plate 138 of the clutchbrake 126, a sprocket 152 keyed to the input shaft of the clutch 124 and a sprocket 156 keyed to the input shaft of the clutch 122. It will be noted that each of the sprockets 50', 146, 150 and 152 are of the same effective diameter so that the shafts to which the sprockets are connected will be driven at the same speed and in the same direction as the drive shaft 48'. The sprocket 156, however, is one-half the effective diameter of the sprocket 146 and thus will impart a rotational speed to the input shaft of the clutch 122 twice the rotational speed of the drive shaft 48'.

The output shaft 158 of the clutch 124 carries a drive sprocket 160 coupled by an endless chain 161 to a drive sprocket 162 keyed on the shaft of the winding roller 38'. Both sprockets 160 and 162 are of the same effective diameter as the sprocket 146.

In light of the drive organization illustrated in FIG. 10 of the drawings, it will be appreciated that first and second drive trains are provided for the roller 38' in a manner similar to the first and second drive trains described above with respect to the embodiment of FIGS. 1–8. The clutches 122 and 124, being alternately energized by appropriate control means (not shown), will determine the speed at which the winding roller 38' is rotated. Specifically, energization of the clutch 124 and correspondingly deenergization of the clutch 122 will effect a drive train from the sprocket 146 to the clutch 124, sprocket 160, chain 161 and sprocket 162 to the winding roller 38' at a transmission ratio of 1:1 as required for the rotation of the winding roller 38' during the load retract and unload modes of operation. Also it will be appreciated that the clutch-brake 126, during these operational modes, will be operated to couple the roller 40' to the sprocket 150 by energization of the coil 144.

Where manipulation of the upper apron 34' requires rotation of the roller 38' at twice the speed of the drive shaft 48' and braking of the winding roller 40' as in the load and unload retract modes of operation, the clutch 124 will be deenergized whereas the clutch 122 will be energized. In this condition, a direct drive coupling with the roller 38' is effected through the sprocket 156. Because of the relative size of the sprocket 156, rotation of the roller 38' will occur at twice the speed of the drive shaft 48'. The coil 142 of the clutch-brake 126 will, of course, be energized to retain the winding roller 40' against rotation.

The embodiment of FIGS. 10 and 11 is advantageous in the sense that it enables the driving components for the winding rollers to be located at one end of the chassis or duplicated at opposite ends thereof. On the other hand, the embodiment of FIGS. 1–8 is preferred because it enables a positioning of the winding rollers providing for a shorter length of the belt material establishing the upper apron. If the lower apron assembly 26 was to be omitted in a machine using only the disclosed upper apron assembly 24, then the winding roller 38 would be positioned toward the front of the chassis. Such a machine would rely on the low-friction characteristics of the apron to slide relative to the bed mattress or other surface to or from which the patient was transferred.

Thus is will be seen that by the present invention there is provided an improved drive and transmission mechanism for patient transfer devices of the type referred to and by which the aforementioned objectives are completely fulfilled. It is also contemplated that various modifications and/or changes may be made in the embodiment illustrated and described herein without departing from the invention. It is expressly intended therefore that the foregoing description is illustrative of a prefered embodiment only, not limiting, and that the true spirit and scope of the present invention be determined by reference to the appended claims.

We claim:

1. In an object transfer apparatus of the type having a chassis to establish a load carrying deck structure with inner and outer edges and at least one extensible apron assembly adjustable between a retracted condition overlying the deck structure and an extended condition located at least in part beyond the outer edge of the deck structure over a surface to or from which an object is to be transferred, the apron assembly being comprised of a supporting separator translatable between retracted and extended positions corresponding respectively to the retracted and extended conditions of the assembly and an apron established by flexible belt material trained about the top, leading outer edge and bottom surfaces of the separator to define upper and lower flight portions merging at the leading outer edge of the separator, the apron assembly being operative so that the upper flight portion may be either held stationary relative to the deck structure during translating movement of the separator relative to the object to be transferred or moved with the separator to effect lateral transfer of an object overlying the separator, movement of the separator being accompanied by a variation in the length of the upper and lower flight portions, the improvement comprising:

a finite length of flexible belt material to establish the apron;

first and second winding elements mounted for rotation on said chassis;

means connecting opposite ends of the apron to said first and second winding elements respectively such that linear movement of the upper apron flight portion relative to the separator is controlled by said first winding element and linear movement of the lower apron flight portion relative to the separator is controlled by said second winding element; and common drive means for translating the separator and for rotating said first and second winding elements, said drive means including shiftable transmission means by which said first and second winding elements may be operated either to retain, pay out or take in the upper and lower flight portions respectively in synchronization with movement of the separator.

2. The apparatus recited in claim 1 wherein said transmission means comprises:

first and second drive trains, said second drive train having an output speed twice the speed of said first drive train and said common drive means;

means for alternately coupling said first drive train with both said first and said second winding elements and said second drive train with said second winding element alone; and means for holding said first winding element against winding rotation when said second element is coupled to said second drive train.

3. The apparatus recited in claim 2 wherein said common drive means includes a drive shaft and wherein said first and second drive trains each include a drive sprocket coupled for rotation with said drive shaft, a driven sprocket and an endless drive chain coupling said drive sprocket and said driven sprocket, the driven sprocket of said second drive chain being one-half the effective diameter of the drive sprocket thereof.

4. The apparatus recited in claim 3 wherein said winding elements are rollers extending the length of the chassis and are of the same effective diameter as said sprockets in said first drive train.

5. The apparatus recited in claim 4 wherein said first and second drive trains are operative on opposite ends of said rollers.

6. The apparatus recited in claim 5 wherein said drive sprockets of said first and second drive trains are keyed on countershafts coupled for direct rotation with said drive shaft.

7. The apparatus recited in claim 6 wherein said means for holding said winding element against winding rotation is positioned on the same end of the chassis as said second drive train.

8. The apparatus recited in claim 4 wherein said first and second drive trains are operative on the same end of the chassis.

9. The apparatus recited in claim 8 including a pair of alternately energized clutches, one of said clutches coupling the driven sprocket of said second drive train directly to said second winding element whereas the other of said clutches is operative to couple the drive of said first drive train to the driven sprocket thereof and to said second winding element.

10. In an object transfer apparatus including a chassis having end plates depending from a load carrying deck structure with inner and outer edges and a pair of superposed extensible apron assemblies adjustable between a retracted condition overlying the deck structure and an extended condition located at least in part beyond the outer edge of the deck structure over a surface to or from which an object is to be transferred, the upper one of said pair of apron assemblies being comprised of a supporting separator translatable between retracted and extended positions corresponding respectively to the retracted and extended conditions of the assemblies and an apron established by flexible belt material trained about the top, leading outer edge and bottom surfaces of the separator to define upper and lower flight portions merging at the leading outer edge of the separator, the upper apron assembly being operative so that the upper flight portion may be either held stationary relative to the deck structure during translating movement of the separator relative to the object to be transferred or moved with the separator to effect lateral transfer of an object overlying the separator, movement of the separator being accompanied by a variation in length of the upper and lower flight portions, the improvement comprising:

a finite length of flexible belt material to establish the upper apron;

first and second winding rollers rotatably supported at opposite ends by the end plates under the deck structure of the chassis;

means connecting opposite ends of said upper apron to said first and second winding rollers respectively such that linear movement of the upper apron flight portion relative to the separator is controlled by said first winding roller and linear movement of the lower apron flight portion relative to the separator is controlled by said second winding roller;

a common drive shaft for translating the separator and for rotating said first and second winding rollers; and shiftable transmission means by which said first and second winding rollers may be operated either to retain, pay out or take in the upper and lower flight portions respectively in synchronization with movement of the separator during rotation of said drive shaft.

11. The apparatus recited in claim 10 including:

a pair of axially spaced drive sprockets fixed for rotation on said drive shaft;

a separator translating chain engaged with one of said drive sprockets;

said transmission means comprising a roller drive chain engaged with the other of said drive sprockets;

first and second drive trains each having an input sprocket engaged by said roller drive chain and a rotary output means, the rotary output speed of said second drive train being twice that of said first drive train and of said drive shaft;

first clutch means for coupling and decoupling the output means of said first drive train said first winding roller;

second clutch means for coupling and decoupling the output means of said first drive train with said second winding roller;

third clutch means for coupling and decoupling the output means of said second drive train with said second winding roller; and brake means for retaining said first winding roller against rotation during coupling operation of said third clutch means.

12. The apparatus recited in claim 11 wherein said first and second clutch means are coaxially aligned with said first and second winding rollers, respectively and positioned at one end thereof and wherein said brake means and said third clutch means are coaxially aligned with said winding rollers, respectively and positioned at the other end of said winding rollers.

13. The apparatus recited in claim 12 wherein said winding rollers are positioned at the rear of the chassis under the deck thereof and wherein said drive shaft is positioned near the front of the chassis.

14. The apparatus recited in claim 11 wherein said first clutch means and said brake means are coaxially aligned with said first winding roller both at one end thereof and wherein said third clutch means is coaxially aligned with said second roller.

15. The apparatus recited in claim 14 wherein the output means of said second clutch means comprises a chain and sprocket coupling with said second winding roller.

* * * * *

UNITED STATES PATENT OFFICE

CERTIFICATE OF CORRECTION

Patent No. 3,947,902 Dated April 6, 1976

Inventor(s) John Conde et al

It is certified that error appears in the above-identified patent and that said Letters Patent are hereby corrected as shown below:

Page 1, item "[45] April 6, 1975", should read --[45] April 6, 1976--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*